Oct. 13, 1970 | F. BROUWER | 3,534,165
FACSIMILE MARKING CIRCUIT
Filed July 28, 1967
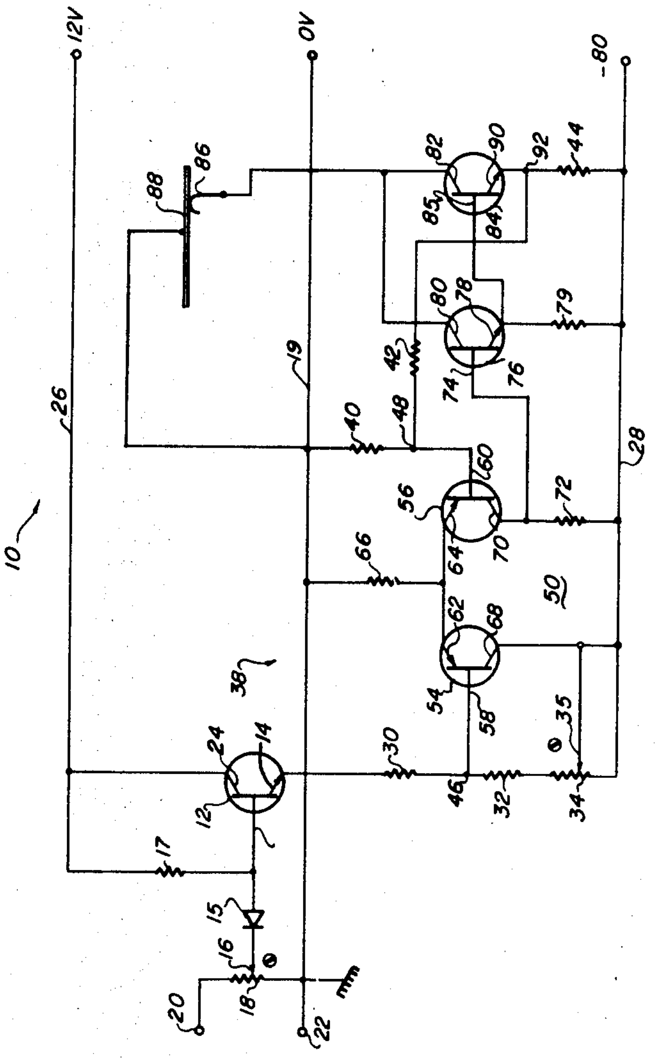
INVENTOR
FRANS BROUWER
By [signature]
Attorney

United States Patent Office 3,534,165
Patented Oct. 13, 1970

3,534,165
FACSIMILE MARKING CIRCUIT
Frans Brouwer, Glencoe, Ill., assignor to Stewart-Warner Corporation, Chicago, Ill., a corporation of Virginia
Filed July 28, 1967, Ser. No. 656,825
Int. Cl. H04n *1/22*
U.S. Cl. 178—6.6 16 Claims

ABSTRACT OF THE DISCLOSURE

A marking circuit for a facsimile receiver utilizing a balanced bridge for relating the input facsimile signals having one polarity to the opposite polarity power source requirements of the remaining portions of the circuit. The facsimile signal input forms a part of one branch of the bridge circuit and variations in that signal cause unbalance of the bridge circuit. The variations in unbalance cause variations through the facsimile marking electrodes and recording medium by means of a current driver and also provides a balance restoring signal to the balance bridge.

BACKGROUND OF THE INVENTION

Facsimile systems are used primarily for relaying duplicate copy representations of documents between remote locations. Generally, a facsimile system comprises a transmitter in which an electrical or electromechanical means scans the document to produce a signal which varies in accordance with the light intensity of the segment being scanned. A receiver at a remote location applies the varying signals to an electromechanical scanning transducer to cause the marking of an electrosensitive medium with the marking density corresponding to the copy density of the document at the transmitter being scanned. The scanning means in the transmitter and the receiver are synchronized with one another so that the copy formed at the receiver is essentially a reproduction of the document scanned at the transmitter.

Facsimile equipment is used primarily with communication lines supplied by the telephone companies. These lines are essentially voice grade telephone circuits with some special treatment to upgrade them to be suitable for facsimile use. Therefore, the facsimile equipment previous to this invention have been restricted to use only with special telephone lines leased from the telephone company.

Leased line operation is expensive and this expense in turn limits the number of transmitting or receiving terminals which a user can afford to maintain. The cost of leased lines can range from perhaps $3.00 to as much as $7.00 per mile per month so that exceptionally large volumes of documents must be relayed before reasonable costs per document can be obtained. The use of facsimile to relay documentary information has, therefore, been restricted in the past to high volume users.

Since the leased telephone lines represent a substantial portion of the cost per document figure, a substantial savings can be realized by the low volume user if he could avail himself of equipment which operates over the normal telephone switching network. No special lines would be necessary and the cost per document figures would be determined by the actual time for transmission. There would be no charge for time off the line as in the case of leased line systems because the lines are already in place for normal telephone communications.

In the past the need for leased lines has limited the use of facsimile systems to the transmission of documents between two fixed locations. Generally, the lines are strung especially for the user, and he is thus limited to transmissions between the terminals of the specially strung lines. However, equipment has been designed which is adapted for use on the telephone switching networks. An example of such equipment is disclosed in U.S. patent application Ser. No. 307,844, filed Sept. 10, 1963, by Dudley Gray, which may be used between any two remote locations served by the telephone system and can be interconnected whenever desired just as telephones for normal voice communication.

The equipment described in that application is designed for use with the normal telephone switching networks such as owned and operated by the Bell Telephone system in conjunction with terminal equipment manufactured and supplied by the Bell Telephone Company under their tradename "Dataphone" Model No. 602A which is now available to the public. The "Dataphone" is a dial telephone to which data handling capabilities have been added. It is used in exactly the same way as an ordinary dial telephone for local or toll voice calls. "Dataphones" are supplied by the telephone companies at the desired terminals and a facsimile transmitter and/or receiver of the type described is connected thereto.

The "Dataphone" equipment is presently designed to operate with input and output terminal signals ranging between zero and +7 volts. This requirement, therefore, establishes a fixed parameter to which compatible apparatus must be designed.

Optimum design of electrolytic type facsimile receivers require that the stationary recording electrode be fixed at ground potential with the standing electrodes being connectable to adequate current driver means to a negative power source. These requirements are dictated by the fact that the stationary electrode is often handled by an operator and the recording medium necessitates a current flow therethrough in a particular direction. It thus is necessary to relate the positive going signals at the facsimile receiver input to the negative power source required for proper marking of the electrolytic recording medium. In the system of the previously mentioned Gray application, this was accomplished by modulating a subcarrier frequency signal generated within the facsimile receiver with the fluctuating video input signal. The modulated signal is transmitted through a DC isolating transformer to an amplifying circuit for providing the properly oriented marking current.

The present invention provides a much simpler and hence more economical circuit for relating the facsimile input signals to the facsimile marking current requirement. It does so by means of a bridge circuit in which the facsimile signal input forms a portion of one branch thereof. The bridge is quiescently balanced and is operable to become unbalanced responsive to variations in the input signal. Means are provided across the output of the balanced bridge for varying the flow of current through the current driver, the electrodes and the recording medium or paper. Means are also provided responsive to the variation of current flow through the current driver for adjusting the bridge circuit towards its balanced condition.

This invention will be better understood from the following detailed description of a preferred embodiment, especially when taken in view of the accompanying drawing, which is a schematic diagram of a facsimile receiver marking circuit embodying the teachings of this invention.

The facsimile marking circuit 10 comprises an input transistor 12 having its base 14 connected through diode 15 to the sliding contact 16 of a gain control potentiometer 18 and through resistor 17 to a positive voltage source conductor 26. The diode 15 and resistor 17 provide temperature compensation in a well known manner. The potentiometer 18 has one end of its fixed resistance connected to the ground conductor 19 and the other end connected to the video input terminal 20, the other input terminal 22 being connected to ground. The collector 24 of the input transistor 12 is connected directly to the positive voltage conductor 26 while the emitter is connected to a negative voltage source on line 28 through the series connected resistors 30, 32 and the fixed resistance of a potentiometer 34. The purpose of potentiometer 34 with its negative voltage connected slider contact 35 will be discussed later.

It will be noted that resistor 30, transistor 12 and the positive 12-volt power supply form one branch of a bridge circuit 38 with resistor 32 and potentiometer 34 forming a second branch. The third branch of the bridge circuit 38 is formed by resistor 40, and the fourth branch is formed by resistors 42 and 44, resistors 40, 42 and 44 being series connected between the 80-volt line 28 and the ground line 19. The junction point 46 between resistors 30, 32 and the junction point 48 between resistors 40, 42 are the balance points of the bridge circuit 38 and feed the input of a differential amplifier 50 formed of the two transistors 54, 56. Thus, the transistor bases 58, 60 are connected to the respective junctions 46, 48 while the emitters 62, 64 are commonly connected through a resistor 66 to ground. The collector 68 of transistor 54 is connected directly to the negative voltage conductor 28 while collector 70 of transistor 56 is connected to resistor 72 through the negative voltage on line 28.

The output from the collector 70 of transistor 56 is applied to the base 74 of transistor 76. The collector 80 of transistor 76 is commonly connected with the collector 82 of transistor 84 to the movable marking electrode 86 which cooperates with the grounded printer electrode 88 to mark the electrolytic recording medium passing therebetween. The transistor 84 has its emitter 90 connected to junction 92 between bridge resistors 42, 44 and its base 85 is connected directly to the emitter 78 of transistor 76. It will thus be recognized that the transistors 76 and 84 form a high beta, Darlington type current amplifier or driver for providing current flow through the electrolytic recording paper between the electrodes 86 and 88. The resistor 79 in the emiter circuit of transistor 76 is merely a path for leakage current from the base-collector circuit of transistor 84.

The circuit operates to provide marking current variations through the recording medium responsive to facsimile video signals in the following manner.

The circuit is designed so that no mark is produced on the recording medium when the input voltage is zero and a maximum density mark is produced when the input signal is of maximum voltage. Thus, the color density gradient will range from no mark to maximum density in proportion to the input signal gradient ranging from zero to maximum amplitude. The marking density of course is dependent upon the amount of current flow between the electrodes 86, 88 through the recording medium, and, hence, when the circuit is in a quiescent state with no signal input, the hi-beta amplifier transistors 76 and 84 should be right at cut off to prevent current flow through the recording medium. The voltage drop across the output resistor 72 of the differential amplifier 50 therefore must be very low-of the order of 0.2 volt-to compensate for the base-to-emiter junction voltages of the transistors 76, 84. The differential amplifier 50 is therefore adjusted by means of the bias poteniometer 34 to provide the 0.2 volt drop across resistor 72 with zero voltage across the input terminals 20, 22. Under these conditions the voltage differential between the output junction points 46, 48 of the bridge circuit is very small—in the order of .1 volt or less.

A video signal appearing at the input terminals 20, 22 will cause voltage variations at the base of the input transistor 12 which range from zero to seven volts in accordance with the density of the copy being scanned at the transmitter. The junction point 46 follows the voltage swings of the input signal since transistor 12 is connected as an emitter follower. An increasing voltage in a positive direction at the base of transistor 54 reduces the current flow therethrough, so that a greater current flows through transistor 56 due to the constant current function of resistor 66. The voltage drop across the differential amplifier load transistor 72 thus increases.

The Darlington amplifier transistors 76, 84 are caused to conduct in accordance with the signal across resistor 72 and hence provide a marking current across the electrodes 86, 88 through the paper therebetween. Since resistor 79 has a high value, most of the emitter current for transistors 76 and 84 flows through resistor 44. The drop thereacross also increases with increasing input signals. Since resistor 44 forms a part of the balanced bridge the voltage variations across it are reflected back to the junction point 48 of the bridge circuit tending to bring the bridge back toward a balanced condition. That is, as the input signal increases the voltage at point 46 also increases. The bridge is thus unbalanced to provide a conduction signal to the Darlington amplifier and through the recording medium. The curernt through resistor 44 increases which raises the voltage of point 48 toward the increased voltage at point 46. The feedback provided by the resistor 44 thus maximizes the linearity of the circuit. The gain of the circuit is controllable by the potentiometer 18 at the input. The control is set so that a maximum density mark (ordinarily black) will be made when a maximum signal voltage appears at input terminals 20, 22.

The following table lists circuit values for an operable circuit to be used with a power supply having the voltages indicated on the drawing and an input voltage swing range from 0 to +7 volts.

Resistors:
- 17—22K
- 18—1K
- 30—6.8K
- 32—3K
- 34—500
- 40—6.8K
- 42—3.3K
- 44—15
- 66—6.8K
- 72—2.2K
- 79—470

Diode: 15—IN401

Transistors:
- 12—40232
- 54,56—2N4036
- 76—2N2405
- 84—2N3716

It may thus be seen that a simplified circuit has been provided for relating the positive going video input signals to the negative voltage source required for proper current flow through the electrolytic paper while maintaining the stationary printer electrode 88 at ground potential. As previously mentioned, it is important that the electrode 88 be maintained at ground potential since a facsimile operator is frequently required to handle the printer bar.

Another advantage of the described circuit is the common mode rejection of spurious variations in power supply voltage output. The variations in the negative voltage power supply will have equal and offsetting effects on the branches of the bridge circuit as well as on the differential amplifier 50 to minimize the effect on the total circuit operation.

While there has been described herein a preferred embodiment of a facsimile marking circuit embodying this invention it is apparent that modifications and additions may be made thereto without departing from the essence of the invention. It is therefore intended to be limited only by the scope of the appended claims.

What is claimed is:

1. In a facsimile recorder having a pair of electrodes for electrolytically marking recording medium passing therebetween, a circuit for providing electric current flow through said electrodes and recording medium comprising a current driver connected to said electrodes, means for receiving an input video signal, a quiescently balanced bridge circuit having a first branch including said input means and operable to become unbalanced responsive to variations in the input signal, means across the output of said balanced bridge for varying the flow of current through said current driver to said electrodes and said recording medium in accordance with the unbalance of said bridge circuit and means responsive to the variations in flow of current through said current driver for adjusting said bridge circuit towards a balanced condition.

2. In the facsimile recording circuit of claim 1 wherein said current varying means comprises a differential amplifier having its input connected across the output of said balanced bridge.

3. In the facsimile marking circuit of claim 2 wherein said current driver comprises a pair of transistors connected as a Darlington amplifier.

4. In a facsimile recording circuit having a voltage source one terminal of which is grounded, a pair of electrodes for electrolytically marking paper passing therebetween one of which is grounded and the other of which is connected through an amplifying device to the other terminal of said voltage source, means for receiving an input video signal of opposite polarity to said other terminal, and means for relating said voltage source to the opposite polarity signal input means comprising a quiescently balanced bridge circuit having a first branch including said input means and operable to upset the balance of said bridge responsive to variations in the input signal, means across the output of said balanced bridge for varying the flow of current through said amplifying device, through said electrodes and through said paper in accordance with the unbalance of said bridge circuit and means responsive to the variations in flow of current through said amplifying device for adjusting said bridge circuit towards a balanced condition.

5. In the facsimile recording circuit of claim 4 wherein said current varying means comprises a differential amplifier having its input connected across the output of said balanced bridge.

6. In the facsimile marking circuit of claim 5 wherein said amplifying device comprises a pair of transistors connected as a Darlington amplifier.

7. In a facsimile recorder having a scanning electrode and a stationary electrically grounded electrode for electrolytically marking a recording medium passing therebetween in accordance with variations in an input facsimile signal, a marking circuit producing electric current variations through said paper comprising a bridge circuit having four branches, a first one of said branches being grounded at one end and having a transistor the collector-emitter of which are series connected with a power supply, a second one of said branches connected at one end to the other end of said first branch and comprising a resistance, a second power supply connected at one terminal to the other end of said second branch and grounded at its other terminal, a third branch of said bridge circuit being grounded at one end and comprising a resistance, a fourth branch comprising a resistance and connected at its ends to the other end of said third branch and the one terminal of said second power supply, means for providing the facsimile input signal between the base of said transistor and ground, means for detecting a voltage differential between the connection between said first and second branches and the connection between said third and fourth branches, means operable responsive to said detecting means for varying the current flow in said fourth branch in accordance with said voltage differentials to cause said bridge circuit to reduce said voltage differential and means connecting said current varying means to said scanning electrode whereby the current therethrough and through said paper is varied in accordance with the amplitude variations of said facsimile signal input.

8. In the facsimile recorder of claim 7 wherein the grounded terminals of said power sources are of opposite polarity.

9. In the facsimile recorder of claim 7 wherein said voltage differential detecting means comprises a differential amplifier.

10. In the facsimile recorder of claim 7 wherein said current varying means is a Darlington type amplifier.

11. In the facsimile recorder of claim 7 wherein means are provided for adjusting said bridge circuit to present cutoff voltage to the input of said current controlling means for zero amplitude facsimile signal input.

12. In a facsimile recording circuit having a voltage source one terminal of which is grounded, a pair of electrodes for electrolytically marking paper passing therebetween one of which is grounded, means for receiving an input video signal variable from ground in the direction of opposite polarity to the other terminal of said voltage source, a circuit for providing marking current through said electrodes and said paper comprising a quiescently balanced bridge circuit having four resistive branches forming a first junction between the first and second branches, a second junction between the second and fourth branches, a third junction between the third and fourth branches and a fourth junction between the first and third branches, means D.C. coupling said input signals into said first branch, means connecting the grounded voltage supply terminal to said fourth junction and said other voltage supply terminal to said second junction, and means including an amplifier for D.C. coupling the output of said bridge circuit across said first and third junctions to the ungrounded one of said pair of electrodes.

13. In the circuit of claim 12 wherein said last mentioned coupling means comprises a differential amplifier connected between said first and third junction and a current amplifier D.C. coupled between said differential amplifier and said ungrounded electrode.

14. In the circuit of claim 13 wherein means for transmitting feedback is provided between said current amplifier and said bridge circuit to adjust said bridge circuit toward a balanced condition responsive to changes in current flow through said current amplifier.

15. In the circuit of claim 12 wherein said input signal coupling means comprises a transistor and a second voltage source, said voltage source being series connected with the emitter-collector electrodes of said transistor in a polarity direction opposing that of the first voltage source and said input signal is applied between the base of said transistor and said grounded fourth juction.

16. In the circuit of claim 14 wherein said input signal coupling means comprises a transistor and a second voltage source, said voltage source being series connected with the emitter-collector electrodes of said transistor in a polarity direction opposing that of the first voltage source and said input signal is applied between the base of said transistor and said grounded fourth junction.

References Cited

UNITED STATES PATENTS

| | | | |
|---|---|---|---|
| 2,609,442 | 9/1952 | Hester | 178—6.6 |
| 2,926,057 | 2/1960 | Horsch | 346—74 |
| 3,184,750 | 5/1965 | Smith | 346—74 |

OTHER REFERENCES

The Encyclopedia of Electronics Edited by C. Susskind. © 1962 by Reinhold Publishing, pp. 92–94.

RICHARD MURRAY, Primary Examiner

B. L. LEIBOWITZ, Assistant Examiner